(12) United States Patent
Hoelsaeter et al.

(10) Patent No.: US 6,853,515 B1
(45) Date of Patent: Feb. 8, 2005

(54) TAPE DRIVE WITH FAN ON TAKE-UP HUB

(75) Inventors: Hårvard Hoelsaeter, Oslo (NO); Hårvard Holmedal, Oslo (NO); Bjarte Jegerstedt, Oslo (NO)

(73) Assignee: Tandberg Storage ASA, Oslo (NO)

( * ) Notice: Subject to any disclaimer, the term of this patent is extended or adjusted under 35 U.S.C. 154(b) by 147 days.

(21) Appl. No.: 10/377,224

(22) Filed: Feb. 27, 2003

(51) Int. Cl.$^7$ .......................... G11B 15/00; G11B 17/00; G11B 5/008

(52) U.S. Cl. ...................................... 360/96.1

(58) Field of Search .............................. 360/96.1, 97.02, 360/93, 90, 88, 96.3; 720/648, 649; 369/263.1, 264, 270.1, 271.1; 242/324

(56) References Cited

U.S. PATENT DOCUMENTS

| | | | | |
|---|---|---|---|---|
| 4,525,757 A | * | 6/1985 | Imanishi et al. | ....... 360/130.24 |
| 6,699,013 B2 | * | 3/2004 | Zweighaft et al. | ............. 416/1 |
| 2002/0101815 A1 | * | 8/2002 | Nguyen | ...................... 369/264 |

FOREIGN PATENT DOCUMENTS

JP          04061686 A    *  2/1992

\* cited by examiner

*Primary Examiner*—Julie Anne Watko
(74) *Attorney, Agent, or Firm*—Schiff Hardin LLP

(57) ABSTRACT

A tape drive has a motor-driven take-up reel therein with a fan assembly mounted to a bottom flange of the take-up reel for co-rotation with the take-up reel. The take-up reel with the fan assembly is mounted in the tape drive so that the fan assembly draws air into the interior of the tape drive through an opening in a wall of the tape drive housing next to the fan assembly.

10 Claims, 5 Drawing Sheets

TAPE DRIVE WITH FAN ON TAKE-UP HUB

BACKGROUND OF THE INVENTION

1. Field of the Invention

The present invention is directed to a fan for cooling internal components in a magnetic tape drive.

2. Description of the Prior Art

During the operation of a magnetic tape drive, wherein data are transferred to and from a magnetic recording tape, heat is generated by a number of components, including the motors which are used to rotate one or both tape reels in the drive. Conventionally, one or more fans is provided with fan blades rotating next to an opening in the housing of the tape drive. Such a fan, however, itself requires a motor to rotate the blades, and the fan motor thus constitutes an additional heat source if it is located within the housing of the tape drive. Moreover, if the fan motor is located inside of the tape drive housing, this occupies space which can present an impediment to mounting other components inside of the tape drive, or may require that the tape drive housing be made larger.

Alternatively, if the fan is mounted so that its motor is at the exterior of the tape drive housing, this presents an impediment to mounting the tape drive in a receptacle having a standardized form factor, which usually is a rectangular box of standardized dimensions.

Moreover, the presence of one or more motor-driven fans increases the overall power consumption of the tape drive.

SUMMARY OF THE INVENTION

It is an object of the present invention to provide a tape drive for a magnetic data transfer between a magnetic recording head in the tape drive and a magnetic recording tape, which is effectively fan-cooled without the fan occupying significant additional space inside or outside of the tape drive housing.

It is a further object of the present invention to provide a fan-cooled tape drive wherein the fan cooling does not significantly increase the overall power consumption of the tape drive.

These objects are achieved in accordance with the present invention having a motor-driven tape reel therein, the tape reel having a tape hub and top and bottom flanges between which tape is wound, wherein the bottom side of the bottom flange of the reel is provided with a fan blade assembly. The fan blade assembly is rotated simultaneously with the tape reel, by the same motor that rotates the tape reel. Access openings for air are located in a suitable wall of the tape drive, such as the bottom thereof formed by the chassis, so that rotation of the fan blades draws air from the exterior of the tape drive into the interior of the tape drive.

For directing, within the interior of the tape drive, the air drawn into the tape drive by the fan blades, in an embodiment of the invention, a distributor baffle can be provided, at least a portion of which is disposed in the air flow path of the air being drawn into the tape drive. In a version of this embodiment, the distributor baffle can be circular and surround the fan blades, and can have openings in a bottom thereof communicating with the opening or openings through which the air is drawn into the tape drive. Some of these openings in the distributor baffle can be positioned so as to direct the air below the circuit board in the tape drive, on which electrical and mechanical components are mounted. Others of these openings can be disposed so as to direct the incoming air toward the top of the circuit board and/or to generally circulate the incoming air in the interior of the tape drive.

DESCRIPTION OF THE PREFERRED EMBODIMENTS

Figure 1:
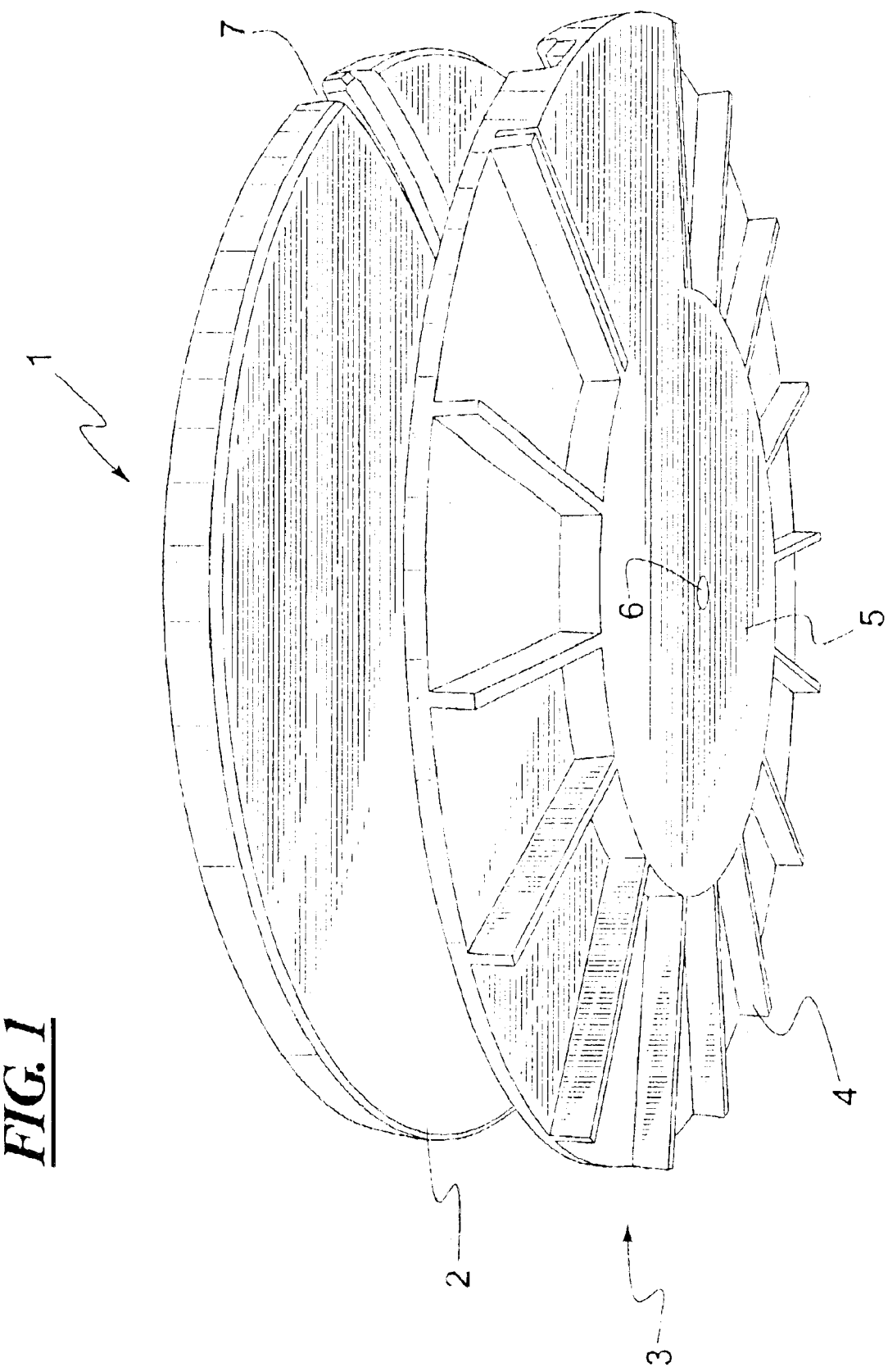
FIG. 1 is an exploded view, as seen from below, of the bottom flange of a take-up reel for a tape drive, with a fan assembly that will be joined to the bottom of the flange.

As shown in FIG. 1, the bottom flange 2 of a take-up reel 1 of a tape drive has a bottom surface, to which a fan assembly 3 will be joined in a suitable manner, such as by adhesive or screws. The fan assembly 3 has a hub 5 from which a number of fan blades 4 radiate. When mounted to the bottom surface of the flange 2, the flange 2 and the fan assembly 3 will rotate together around a center 6.

The bottom flange 2 has a channel 7 therein to facilitate threading and unthreading of the magnetic recording tape on the take-up reel, however, this channel does not perform any function relevant to the present invention.

Figure 2:
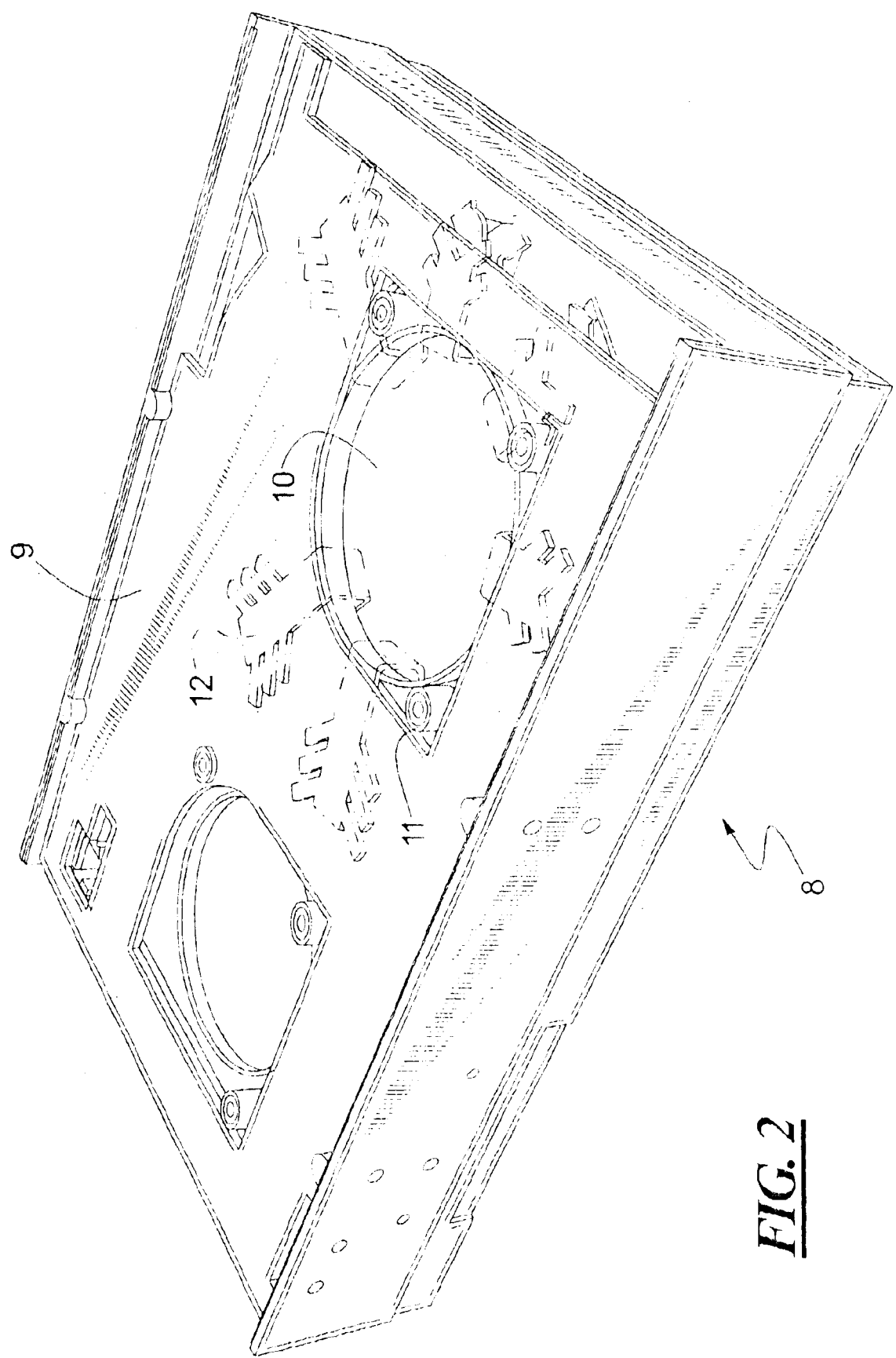
FIG. 2 is a perspective view of a tape drive constructed and operating in accordance with the present invention, disposed bottom side up and with the motor mount removed, with arrows indicating air flow produced by operation of the fan assembly.

The tape drive 8 turned bottom side up is shown in FIG. 2, exposing the chassis 9 to which, among other things, a motor for rotating the take-up reel, and the fan assembly 3 therewith, will be mounted. The motor will project through an opening 10 in the chassis 9. Rotation of the fan assembly 3 will draw air into the interior of the tape drive 8 as schematically indicated by the tails of the arrow 12. This air will flow over the edge of the opening 10 and into the interior of the tape drive 8.

The motor will be mounted at three grommets 11, which receive screws.

Figure 3:
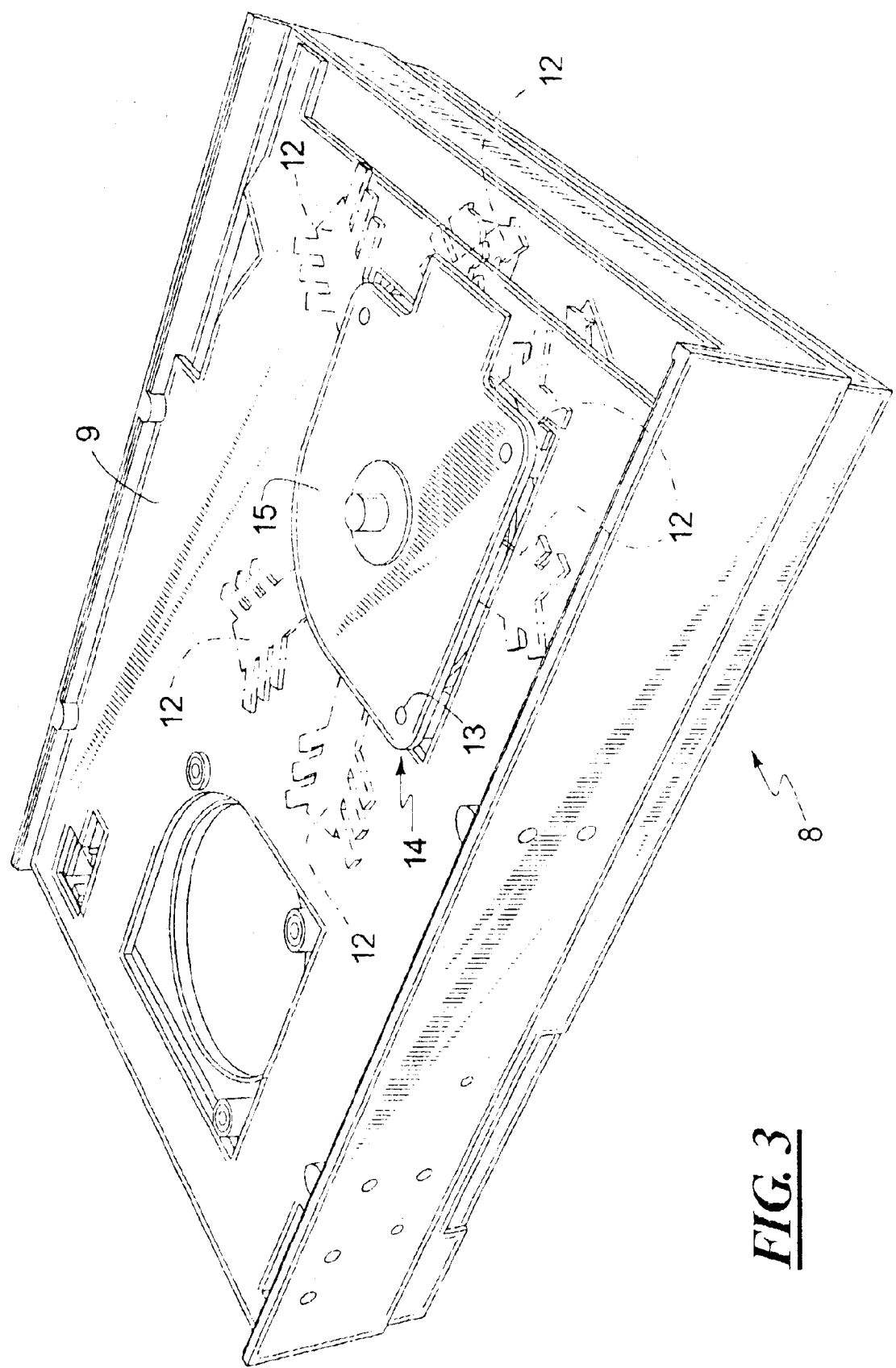
FIG. 3 shows the tape drive of FIG. 2 with the motor mount in place.

The tape drive 8 with the motor assembly 14 mounted thereto is shown in FIG. 3. The motor itself projects into the interior of the tape drive 8 and is mounted to a motor mount plate 15. The motor mount plate 15 is secured to the grommets 11 by screws 13. The grommets 11 project slightly beyond the exterior surface of the chassis 9, so that a space is maintained between the motor mount plate 15 and the chassis 9, thereby allowing air to flow into the interior of the tape drive 8 as indicated by the aforementioned arrows 12.

Figure 4:
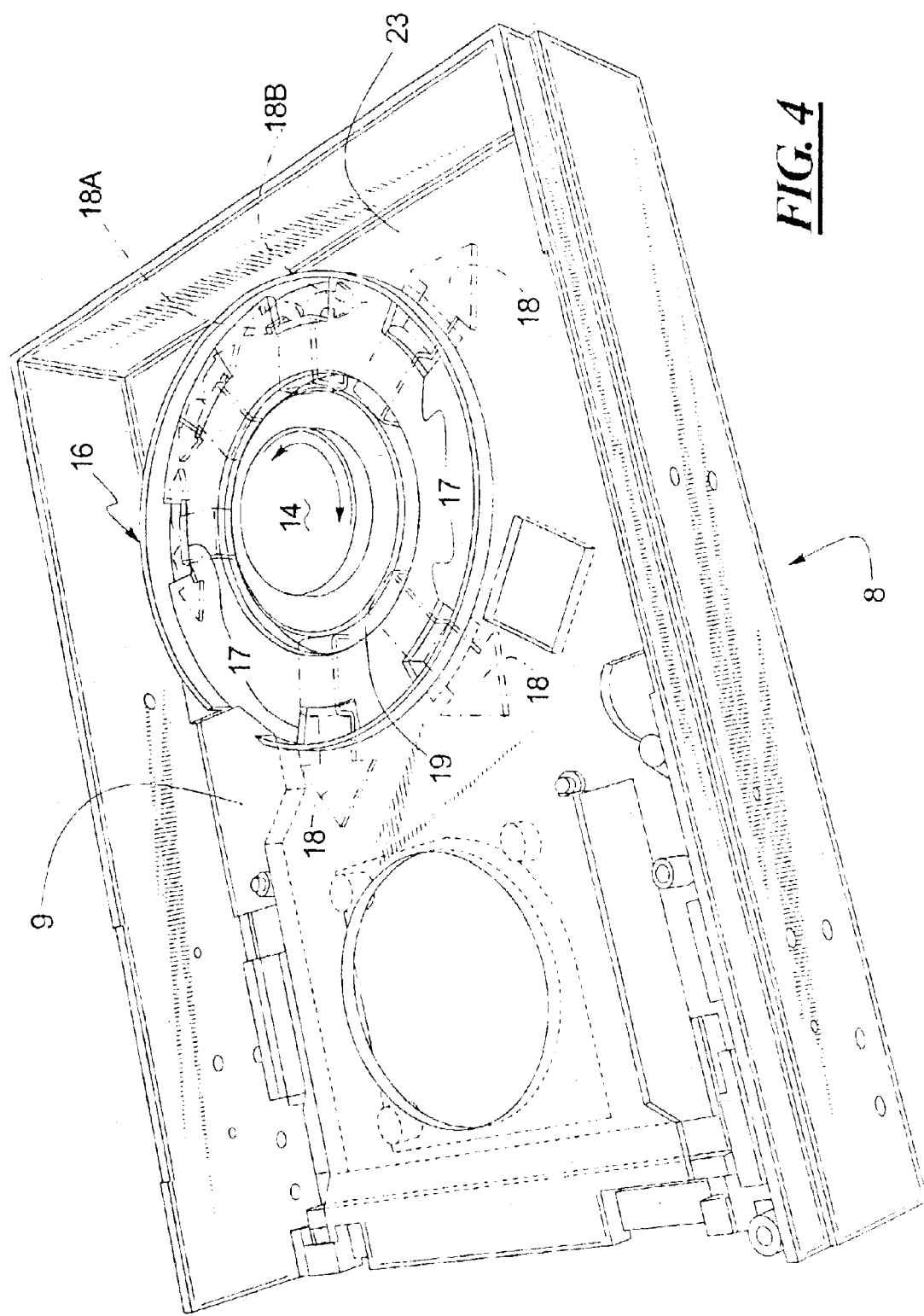
FIG. 4 is a perspective view from above of the tape drive in accordance with the invention, with the top of the tape drive housing removed, and without the take-up reel therein, with arrows indicating air flow in the interior of the tape drive.

The interior of the tape drive 8, with the top of the tape drive 8 removed, and without the take-up reel in place, is shown in FIG. 4. As indicated therein, the motor assembly 14 will produce rotation as indicated by the double-headed curved arrow, operating the fan assembly 3 to draw air into the interior of the tape drive 8. The arrowheads 18 indicate the direction of air flow into the interior of the tape drive 8, consistent with the schematic indications of the tails of the arrows 12 shown in FIGS. 2 and 3.

As can be seen in FIG. 4, a printed circuit board 23 is mounted in the interior of the tape drive 8, on which a number of electrical components are mounted, as well as possibly a number of small mechanical components. Heavier mechanical components are mounted to the chassis 9. The printed circuit board 23 is mounted to the chassis 9 so that a space exists between the bottom surface of the printed circuit board 23 and the top (interior) surface of the chassis 9.

A distributor baffle 16 is mounted concentrically with the motor assembly 14 and the fan assembly 3 and has openings therein which at least partially overlap openings in the circuit board 23 so that air flowing into the interior of the tape drive 8 via an annular gap 19 between the motor assembly 14 and the distributor baffle 16 flows through these openings and beneath the printed circuit board 23; as indicated by the larger arrowheads 18. Air flowing through other openings 17, because of their proximity to sidewalls of the housing of the tape drive 8, will be divided as indicated by the double arrows 18A and 18B and generally circulate within the housing of the tape drive 8, including the space between the circuit board 23 and the chassis 9.

Figure 5:
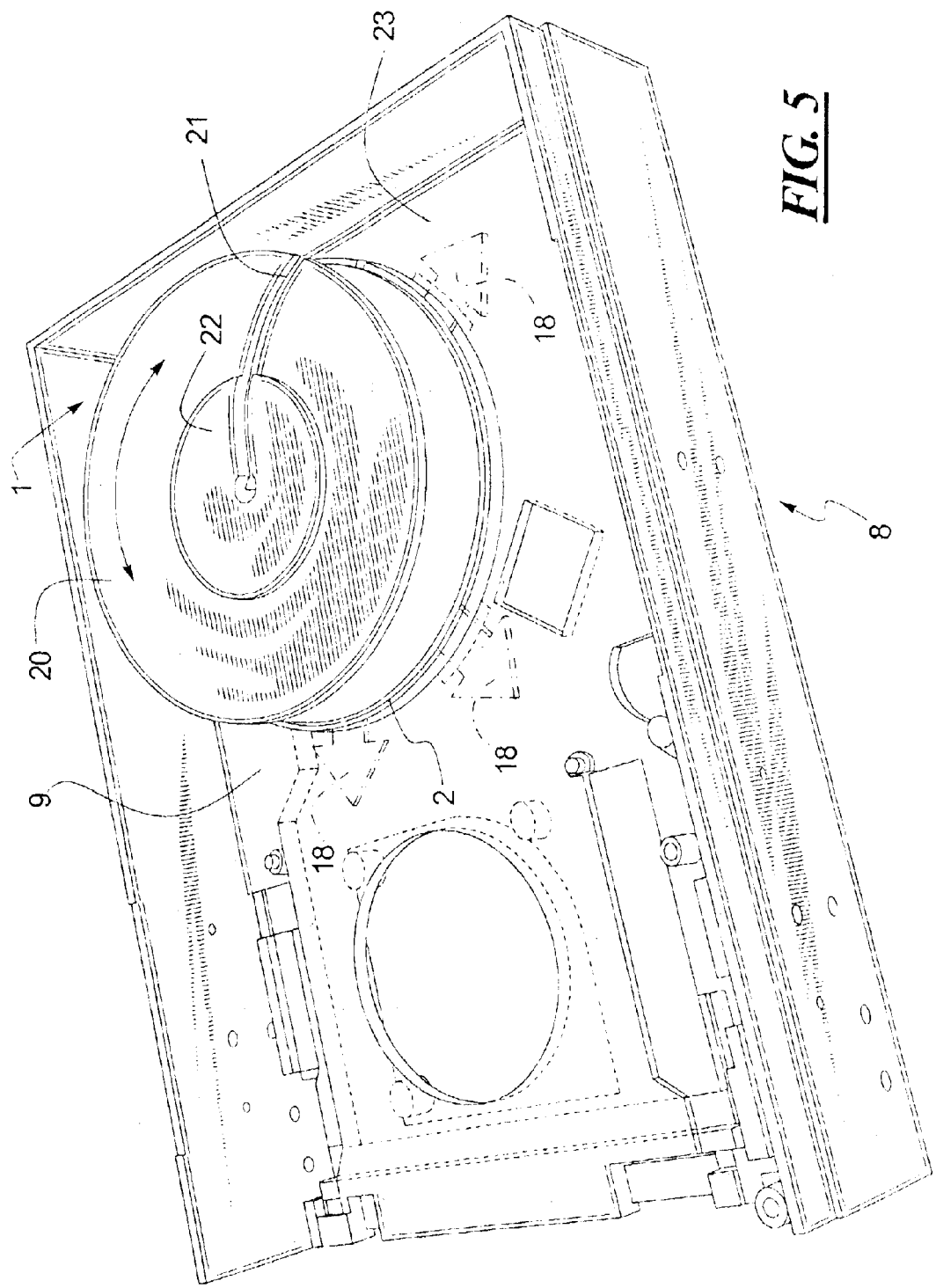
FIG. 5 shows the tape drive of FIG. 4, with the take-up reel in place.

The tape drive 8 is again shown in FIG. 8 with the take-up reel 1 in place, engaged with the motor assembly 14 for rotation thereof as indicated by the curved double-headed arrow. As can be seen in FIG. 5, the take-up reel 1 has an upper flange mounted on a hub 22, to which the lower flange 2 also is mounted. The upper flange 20 has a channel 21 therein in registration with the channel 7 in the bottom flange 2. As can be seen in FIG. 5, the channel 21 continues into the hub 22.

Although modifications and changes may be suggested by those skilled in the art, it is the intention of the inventors to embody within the patent warranted hereon all changes and modifications as reasonably and properly come within the scope of their contribution to the art.

We claim as our invention:

1. A tape drive comprising:
   a housing having a housing bottom with an opening therein;
   a reel disposed in an interior of said housing, said reel having a central hub and a top flange and a bottom flange mounted to said hub spaced from each other and adapted to receive a winding of magnetic recording tape therebetween;
   a fan assembly mounted to a bottom surface of said bottom flange of said reel, said fan assembly being disposed in said opening in said housing bottom when said take-up reel is disposed in said interior of said housing; and
   a motor assembly mounted to said housing bottom and being in driving engagement with said reel to rotate said reel and said fan assembly said fan assembly, when rotated, drawing air in an air flow from an exterior of said housing to said interior of said housing through said opening in said housing bottom.

2. A tape drive as claimed in claim 1 wherein said motor assembly comprises a motor mounted on a motor mount plate, and wherein said motor mount plate is attached at an exterior of said housing bottom overlying said opening.

3. A tape drive as claimed in claim 2 wherein said opening has an opening edge, and wherein said tape drive comprises a plurality of grommets mounted in said interior of said tape drive next to said opening edge and projecting to said exterior of said opening edge beyond said housing bottom, said motor mount plate being fastened to said grommets and forming a gap between said motor mount plate and said housing bottom through which said air flow proceeds.

4. A tape drive as claimed in claim 1 wherein said housing has a chassis forming said housing bottom.

5. A tape drive as claimed in claim 1 further comprising a distributor baffle disposed in said interior of said housing in said air flow path for selectively directing said air flow in said interior of said housing.

6. A tape drive as claimed in claim 5 further comprising a circuit board disposed in said housing, spaced from said housing bottom, and wherein said distributor baffle directs at least a portion of said air flow between said housing bottom and said circuit board.

7. A tape drive as claimed in claim 6 wherein said distributor baffle is a circular baffle having a central opening therein in which said motor assembly is disposed with an annular gap between said circular opening and said motor assembly, with said fan assembly rotating inside said circular baffle.

8. A tape drive as claimed in claim 7 wherein said circular baffle has a plurality of openings therein and wherein said circuit board has a plurality of openings therein at least partially overlapping with respective ones of said openings in said circular baffle allowing passage of said air flow through said openings in said circular baffle and said openings in said printed circuit board to a space between said circuit board and said housing bottom.

9. A reel for a magnetic recording tape comprising:
   a hub;
   a top flange and a bottom flange concentrically mounted to said hub in spaced apart relation and adapted to receive a winding of magnetic recording tape therebetween, said bottom hub having a bottom exterior surface; and
   a fan assembly mounted to said bottom exterior surface of said bottom flange.

10. A reel as claimed in claim 9 wherein said fan assembly comprises a fan assembly hub disposed substantially concentrically with said hub, and a plurality of fan blades radiating outwardly from said fan assembly hub.

* * * * *